US008117643B2

(12) United States Patent
Vidya et al.

(10) Patent No.: US 8,117,643 B2
(45) Date of Patent: Feb. 14, 2012

(54) MATHEMATICAL DEFINITION OF ROLES AND AUTHORIZATIONS IN RBAC SYSTEM

(75) Inventors: Ranganathan Vidya, Bangalore (IN); Madhusudanan Kandasamy, Erode District (IN); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/137,767

(22) Filed: Jun. 12, 2008

(65) Prior Publication Data

US 2009/0313677 A1 Dec. 17, 2009

(51) Int. Cl.
*G06F 7/04* (2006.01)

(52) U.S. Cl. .............................. 726/2; 726/4

(58) Field of Classification Search .............. 726/2, 4
See application file for complete search history.

(56) References Cited

U.S. PATENT DOCUMENTS

| | | | |
|---|---|---|---|
| 6,859,810 B2 | 2/2005 | Andrei et al. | |
| 7,203,697 B2 | 4/2007 | Chang et al. | |
| 7,284,271 B2 | 10/2007 | Lucovsky et al. | |
| 7,451,477 B2 * | 11/2008 | Griffin et al. | 726/1 |
| 7,774,601 B2 * | 8/2010 | Devgan et al. | 713/166 |
| 2006/0218394 A1 * | 9/2006 | Yang | 713/167 |
| 2007/0240231 A1 * | 10/2007 | Haswarey et al. | 726/28 |

\* cited by examiner

*Primary Examiner* — Kambiz Zand
*Assistant Examiner* — Amare F Tabor
(74) *Attorney, Agent, or Firm* — Yee & Associates, P.C.; David A. Mims, Jr.

(57) ABSTRACT

A process, apparatus and program product create a new role in a Role Based Access Control (RBAC) system by using mathematical operators with either one or more authorizations, or one or more existing roles, or a combination thereof.

13 Claims, 6 Drawing Sheets

MATHEMATICAL DEFINITION OF ROLES AND AUTHORIZATIONS IN RBAC SYSTEM

This Invention was made with Government support under PERCS PHASE III, HR001-07-9-002. THE GOVERNMENT HAS CERTAIN RIGHTS IN THIS INVENTION.

FIELD OF THE INVENTION

The present invention generally relates to a Role Base Access Control (RBAC) system and specifically to defining new roles in the RBAC system.

BACKGROUND OF THE INVENTION

User's access to resources of a computer system needs to be controlled for security needs of an organization. The control of these accesses is performed by using access rights that define whether and how a user may access the resources. A security system, which is integrated in or added to the operating system of the computer system, performs this access control.

In traditional security systems, a system administrator (hereinafter interchangeably referred to 'root user' or 'super user') grants or revokes access rights explicitly for individual users or a group of users on respective resources. However, as the number of users increases, and as their access rights are updated from time to time, the access rights in such security systems become increasingly inconvenient to manage. Further, due to the varied and evolving nature of work done by various users on the computer system, it is often difficult to confine 'super user' rights to a small restricted set of users. On the other hand, widespread allocation of 'super user' rights may compromise the security of the computer system. Additionally, in many organizations, the data stored on the computer system and resources may be confidential and access to such data should desirably be granted on a need only basis. However, system administrators with 'super user' rights will have access to such data and resources, irrespective of whether they really need to have this access for their work. This may compromise the confidentiality of the organization's data and resources.

In order to achieve a higher grade of data security and integrity in a computer system, a Role-Based Access Control (RBAC) approach has been developed. The RBAC approach has three main elements: authorizations, roles, and privileges. An authorization is analogous to access rights; it provides a mechanism to grant rights to perform certain actions on the computer system and thereby provides different levels of functionality to different classes of users. A role is a set of management functions unique to a particular class of users of the computer system; multiple authorizations may be assigned to a role in order to allow users under that role to perform the requisite management functions. Privileges are part of the RBAC infrastructure that provides fine granular control of system functions. A user usually acquires privileges based on authorizations granted to their role. In other words, regular users are allowed access to various system functions when they have relevant privileges. Privileges are typically mapped to bit masks and are used in the kernel space to achieve privileged function specific security controls with ease. In practice, a role acts as a definition of a job at the lowest level of granularity used in the enterprise or organization. Roles are similar to the regular user identities except that roles are authorized to perform some privileged tasks. Regular users who are assigned to some roles can perform super user function based on the privileges granted by switching into that role. For example, one role might be to manage file systems, while another role might be to enable creation of user accounts. In the RBAC system, the system administrator only has to grant or revoke authorizations to a role, and group different users of the computer system under each role based on need. The users under a role automatically get the authorizations granted to that role. A super user has more authorizations and privileges than a user. The super user rights are thus divided into granular tasks and assigned to various users based on the authorizations they need for their job or role. For example, a user with the role to manage the file systems will not have authorization for creating the user accounts, and vice-versa, but a super user may have access to both. In this manner, RBAC enables separation of duties among users who have less authorizations and privileges than the traditional super user. The RBAC approach follows the principle of providing "least privilege access" to users, wherein a user has only the least authorizations required to perform his/her role. The RBAC approach has many advantages over traditional security systems such as ease of management, ease of assigning roles to the users (as per their functions in the organization) etc.

However, in many cases there may be situations when a user to whom a role was assigned is not available and that role needs to be assigned to a backup user with some modifications in authorizations of this existing role. The present technique is to create a new role with all required authorizations for the backup user. Management of roles in this manner, particularly for systems that have a large number of users with dynamic role definitions, is a cumbersome process.

In accordance with the foregoing, there is a need in the art of a process, an apparatus, and a program product, for providing improved management of roles in the RBAC system.

BRIEF SUMMARY OF THE INVENTION

A computer implemented process for defining a new role in a Role Based Access Control (RBAC) system is provided. The process includes creating the new role by using mathematical operators with one or more of the following: one or more authorizations and one or more existing roles.

A programmable apparatus for defining a new role in a Role Based Access Control (RBAC) system is provided. The apparatus includes creating the new role by using mathematical operators with one or more of the following: one or more authorizations and one or more existing roles.

A computer program product for causing a computer to define a new role in a Role Based Access Control (RBAC) system is provided. The computer program product includes creating the new role by using mathematical operators with one or more of the following: one or more authorizations and one or more existing roles.

DETAILED DESCRIPTION

Figure 1:
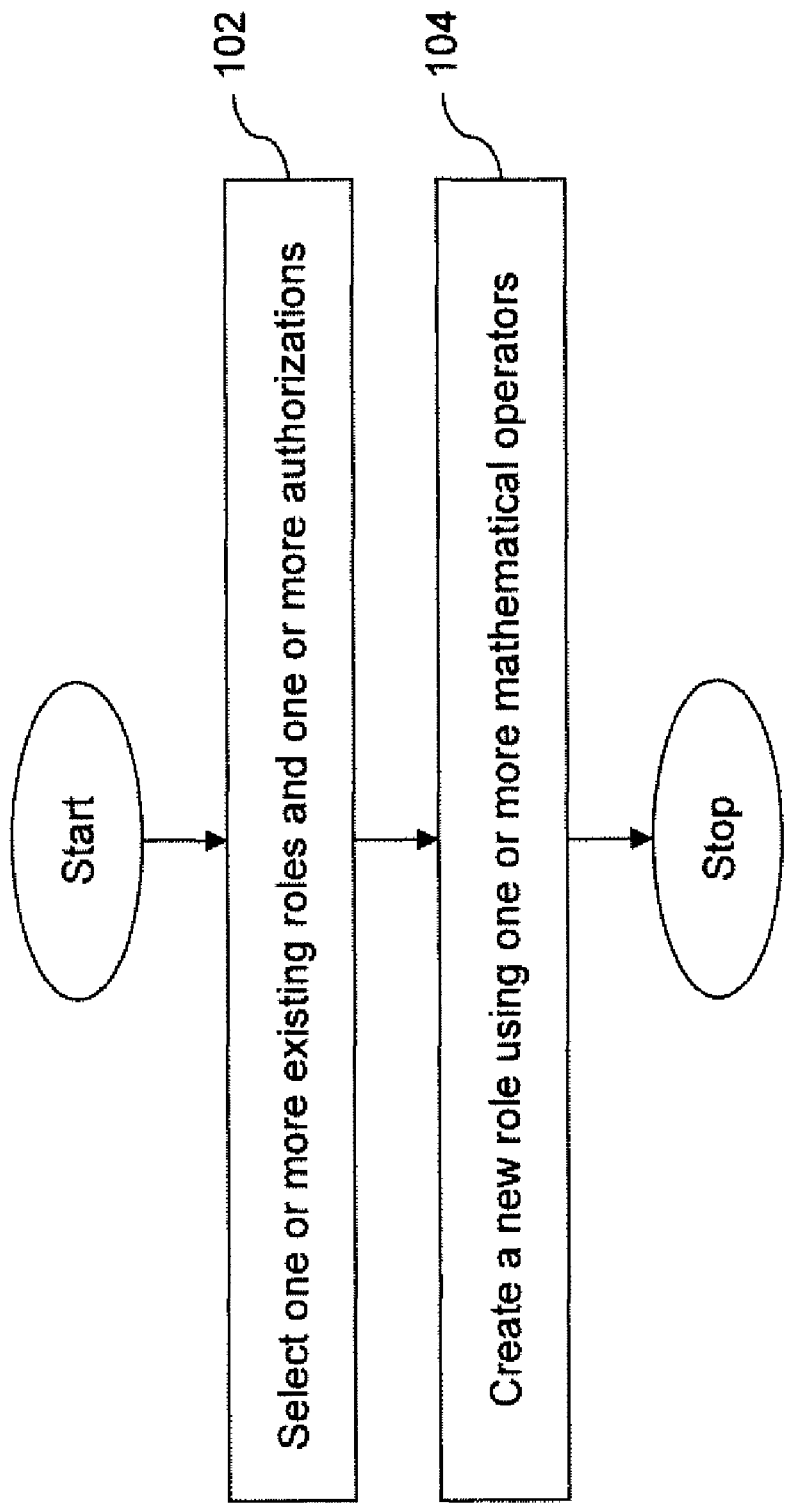
FIG. 1 depicts a flowchart depicting a process for creating a new role using one or more existing roles, and/or one or more authorizations in accordance with an embodiment of the present invention.

The invention is explained with reference to the accompanying figures. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Various embodiments of the present invention disclose a process of creating a new role from some existing roles in a Role Based Access Control (RBAC) system. The new role is created using mathematical operators with the existing roles, or authorizations, or a combination of both the existing roles and the authorizations. Such creation of new roles using existing roles and authorizations facilitates efficient management of roles and authorizations in the RBAC system. For example, when a user to whom an existing role was assigned is unavailable and a backup user needs to be assigned the same role but with some modified authorizations, a new role may be defined for the backup user using a mathematical combination of the unavailable user's role, the backup user's current role, and specific authorizations.

In an embodiment of the present invention, the authorizations are of two types, user-defined authorizations and system-defined authorizations. The user-defined authorizations are customized authorizations that can be defined by a system administrator. On the other hand, the system-defined authorizations are predefined and cannot be modified. The system administrator manages creation and assignment of the roles to users, thus controlling security in the organization. Thus, the system administrator can add, modify or delete the user-defined authorizations.

The authorizations are defined in a hierarchical order separated by a dot operator. In other words, authorization strings can be defined as "ParentAuth.SubParentAuth.SubSubParentAuth" and these strings give a logical representation to an authorization level in the RBAC environment. An exemplary hierarchical representation of a user-defined authorization is "system.filesystem.manage.create". In the example, when a user's role is given this authorization, the user is able to create files in a file system. Similarly, another exemplary hierarchical representation of a system-defined authorization is "unix.system.boot.info". In this example, when a user's role is given this authorization, the user is able to display the system's boot information. In an embodiment of the present invention, the hierarchical representation (as in the above exemplary case, dot operator) is operating system specific. Also, the user-defined authorizations and the system-defined authorizations may have different syntaxes from what are shown in the aforementioned examples. Basically, the privileges are assigned to the string based on the level of authorizations. It will be apparent to a person of ordinary skill in the art that the examples shown here are merely for illustrative purposes and do not limit the scope of the present invention. Various embodiments of the present invention may be practiced using other operating systems and their specific nomenclatures for roles and authorizations.

In accordance with various embodiments, the RBAC system includes an authorization database and a role database. The role database stores the existing roles, while the authorization database contains the user-defined authorizations. These databases may be stored in any form in the RBAC system, for example as flat files.

In one embodiment of the present invention, the role database and the authorization database are managed at a local file system of a computer system. In another embodiment of the present invention, the role database and the authorization database are managed remotely through a Lightweight Directory Access Protocol (LDAP). LDAP is a protocol that allows information to be stored centrally in a hierarchical database. The information can be fetched using the LDAP protocol. In an embodiment of the present invention, the authorization definitions will be stored in the authorization database at the user level. The user defined authorizations will be downloaded from user space and it will be kept in kernel tables/attributes. The kernel defined authorizations are pre-defined in the kernel space.

FIG. 1 depicts a flowchart for creating a new role using one or more existing roles, or one or more authorizations, or a combination thereof in accordance with an embodiment of the present invention. At step (102), the system administrator selects one or more existing roles or authorizations. In one embodiment of the present invention, the administrator selects only authorizations. In another embodiment of the present invention, the administrator selects only existing roles. In yet another embodiment of the present invention, the administrator selects both existing roles and authorizations. Thereafter, at step (104), the administrator creates a new role by using one or more mathematical operators with a combination selected at step (102). In one embodiment of the present invention, the new role is created by using multiple mathematical operators between two or more roles. In another embodiment of the present invention, the new role is created by using multiple mathematical operators between two or more authorizations. In yet another embodiment of the present invention, the new role is created by using multiple mathematical operators between an existing role and one or more authorizations. These new roles are stored in the role database and hence every new role may thereafter be treated as an existing role and further used to define new roles.

In an embodiment of the present invention, the mathematical operators are, a Not operator (!), a Union operator ($\cup$), an Intersection operator ($\cap$), or a Subtraction operator (−). (An Addition operator (+) may perform a function equivalent to the Union operator ($\cup$).) The Not operator (!) allows negation of the existing roles or the authorizations. The union operator ($\cup$) allows combination of the existing roles and the authorizations. The intersection operator ($\cap$) is used to extract the authorizations or the existing roles which are common in between two existing roles. The subtraction operation (−) is used to remove certain authorizations from the existing roles. It will be apparent to a person of ordinary skill in the art that these one or more mathematical operators are just examples and others mathematical operators can also be used. Basically mathematical operations indicate addition or removal of privileges associated with the authorizations which gets assigned to roles.

FIGS. 2A-D represents creation of new roles in accordance with various exemplary embodiments of the present invention. The FIGURES only indicate logical representation of how mathematically roles or authorizations can be manipulated for creation of new related entities. It essentially works internally on removal or addition of privileges based on these operations. For the sake of convenient reference, a role X is hereinafter denoted as RX. For example, a role 1 is denoted as R1. Also, when a new role is created, it may become a part of the existing roles and hence, used for further creating new roles. In an exemplary embodiment of the present invention, as shown in the FIG. 2A, a new role is created using the mathematical operators between different authorizations. The new roles that are created are represented in the form of sets with union and intersection between the existing roles and/or authorizations. An exemplary authorization is "a.b.c.", where 'a' corresponds to "system", 'b' corresponds to "filesystem" and 'c' corresponds to "manage"; hence the authorization becomes "system.filesystem.manage". Thus, if the authorization "a.b.c" is assigned to a role, a user assigned that role will be able to manage the file system. The authorization "a.b.c" may also have child authorizations like "a.b.c.d1", "a.b.c.d2" and "a.b.c.d3". Here d1 may correspond to "create", d2 may correspond to "remove" and d3 may correspond to "modify". Each of these authorizations have associated privileges based on specific functions "remove", "modify" and "create". The parent authorization as given in the example "system.filesystem.manage" will have all of the privileges that can perform "modify", "remove" and "create". Thus if the authorization "a.b.c.d1" is assigned to a role, the user will be able to only create files in the file system. Similarly, with authorization "a.b.c.d2" the user will be able to only remove files from the file system, and with authorization "a.b.c.d3" the user will be able to only modify files in the file system. It will be apparent to a person of ordinary skill in the art that the aforementioned examples shown for the authorization are only for illustration and do not limit the scope of the invention. Referring to FIG. 2A again, a new role R1 202 is created by first applying a NOT operator (!) on the authorization "a.b.c.d2", (i.e. "!a.b.c.d2") and subsequently applying a Union operator ($\cup$) between the authorizations "a.b.c" and "!a.b.c.d2". The authorization "!a.b.c.d2" indicates that it is not applicable for the definition of role R1 202. Hence R1 202 is defined as R1=a.b.c$\cup$!a.b.c.d2. In other words, R1 202 indicates that all the child authorizations (a.b.c.d1, a.b.c.d2, a.b.c.d3) of the authorization of a.b.c are available for R1 202 except the child authorization a.b.c.d2 (i.e., R1 only has authorizations a.b.c.d1 and a.b.c.d3). Thus, when R1 202 is assigned to a user, the user is able to create and modify files in the file system but is not allowed to remove files from the file system.

Figure 2A:
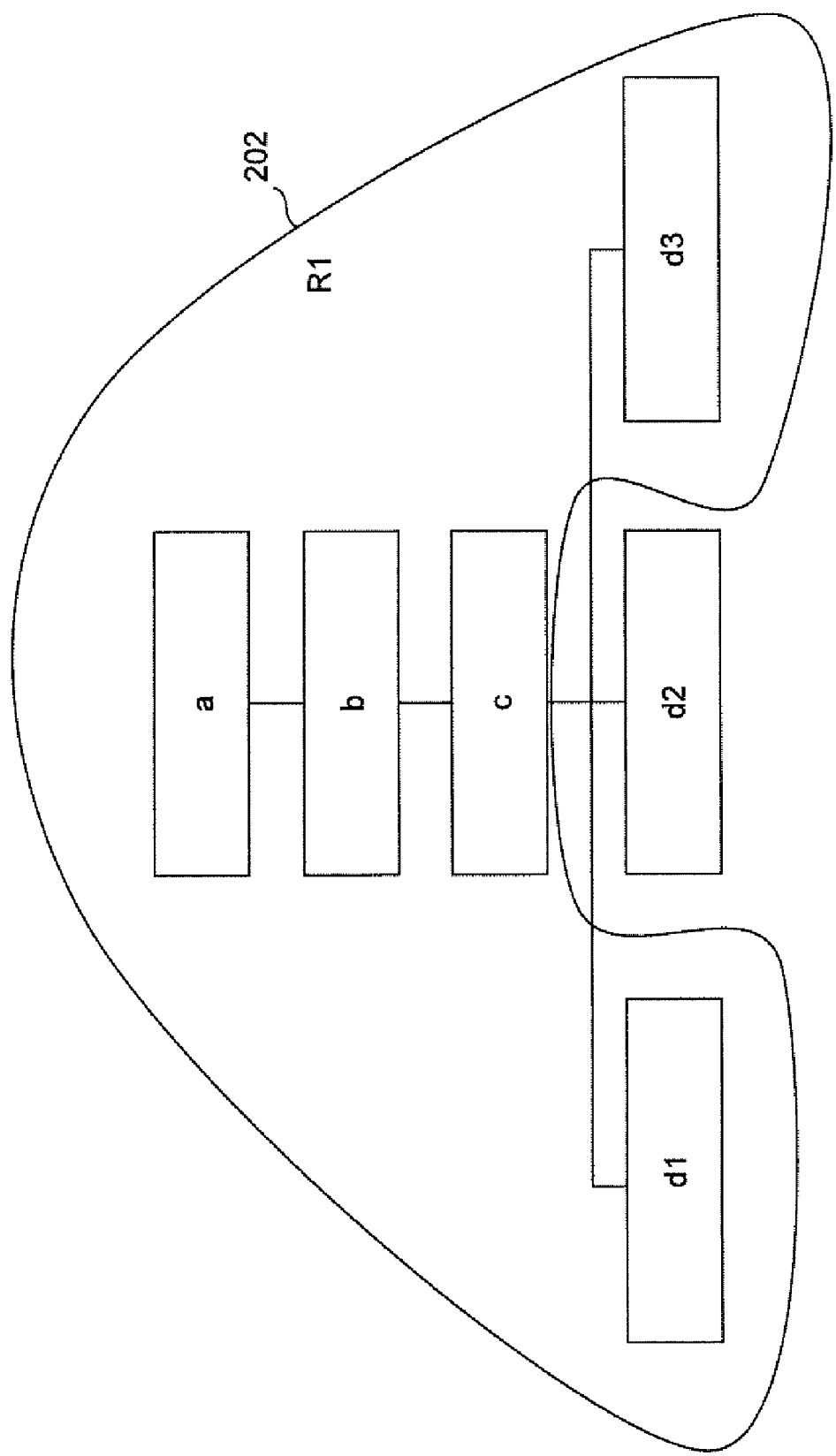
FIGS. 2A, 2B, 2C and 2D provide logical representations of a new role creation in accordance with exemplary embodiments of the present invention.
Figure 2B:
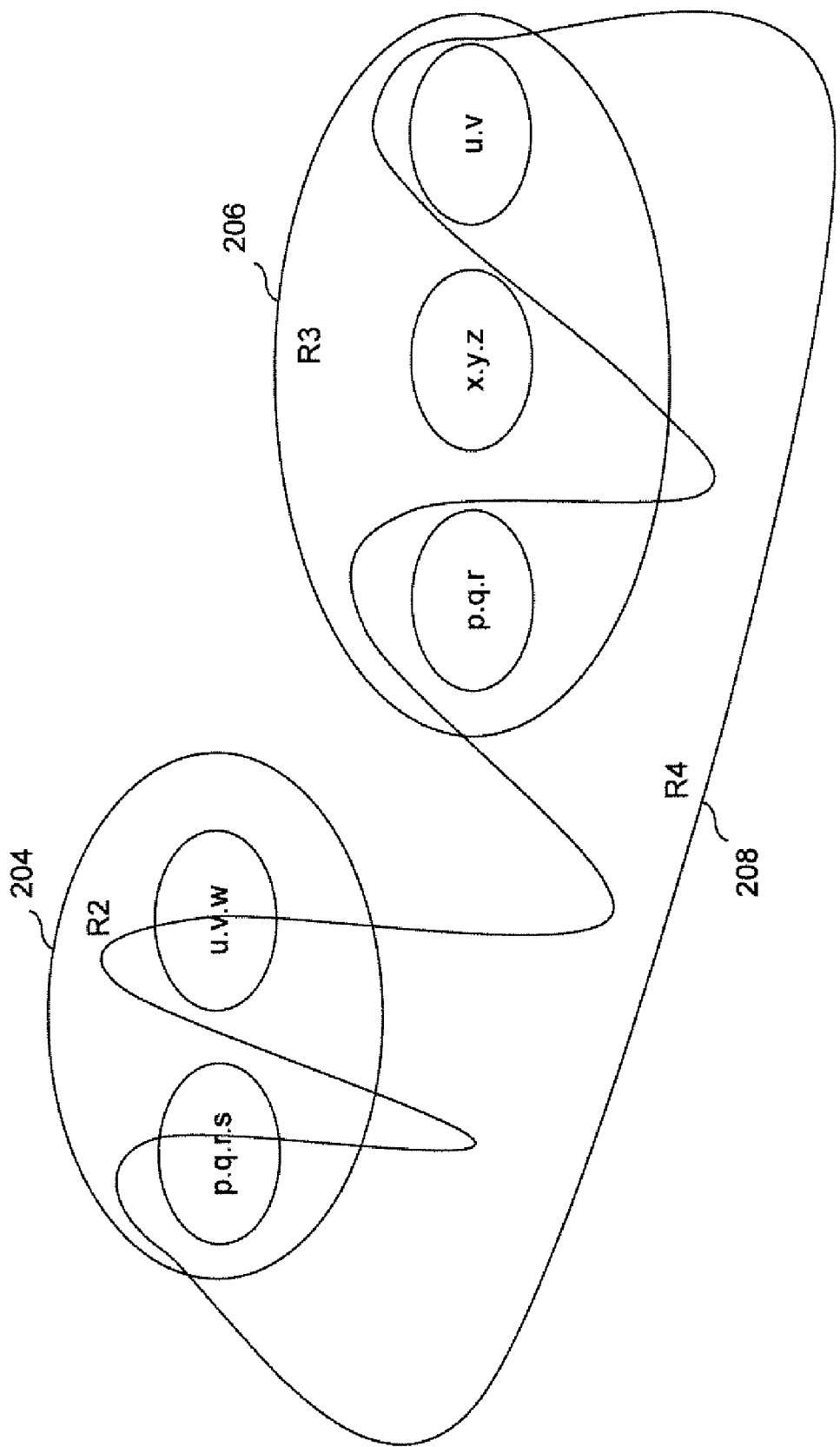

In another exemplary embodiment of the present invention, FIG. 2B depicts creating a new role using the mathematical operators between the existing roles. In this embodiment, a new role is created using the intersection operator ($\cap$) between some existing roles selecting only the authorizations that are common between these existing roles. As shown in FIG. 2B, a role R2 204 is, defined as "R2=p.q.r.s$\cup$u.v.w", and a role R3 206 defined as "R3=p.q.r$\cup$x.y.z$\cup$u.v". Further, a new role R4 208 is created using the intersection operator between R2 204 and R3 206, i.e. R4=R2$\cap$R3. Hence, R4 204 gets only the common authorizations (i.e. "p.q.r" and "u.v") from R2 204 and R3 206. In other words, R4="p.q.r"$\cup$"u.v".

In another case, a new role R5 is created (not shown in FIGS. 2A-D) using the union operator between R2 204 and R3 206, i.e. "R5=R2$\cup$R3". With the use of union operator, R5 gets all the authorizations that are with R2 204 and R3 206 (i.e. p.q.r.s, u.v.w and x.y.z).

In another case a new role R6 is created (not shown in FIGS. 2A-D) using the NOT operator with R1 202, i.e. "R6=!R1". In an embodiment of the present invention, a NOT operator to a role temporarily de-activates that role. Hence, in this case, when the NOT operator is applied to R1 202, it indicates that R1 202 is temporarily inactive.

Figure 2C:
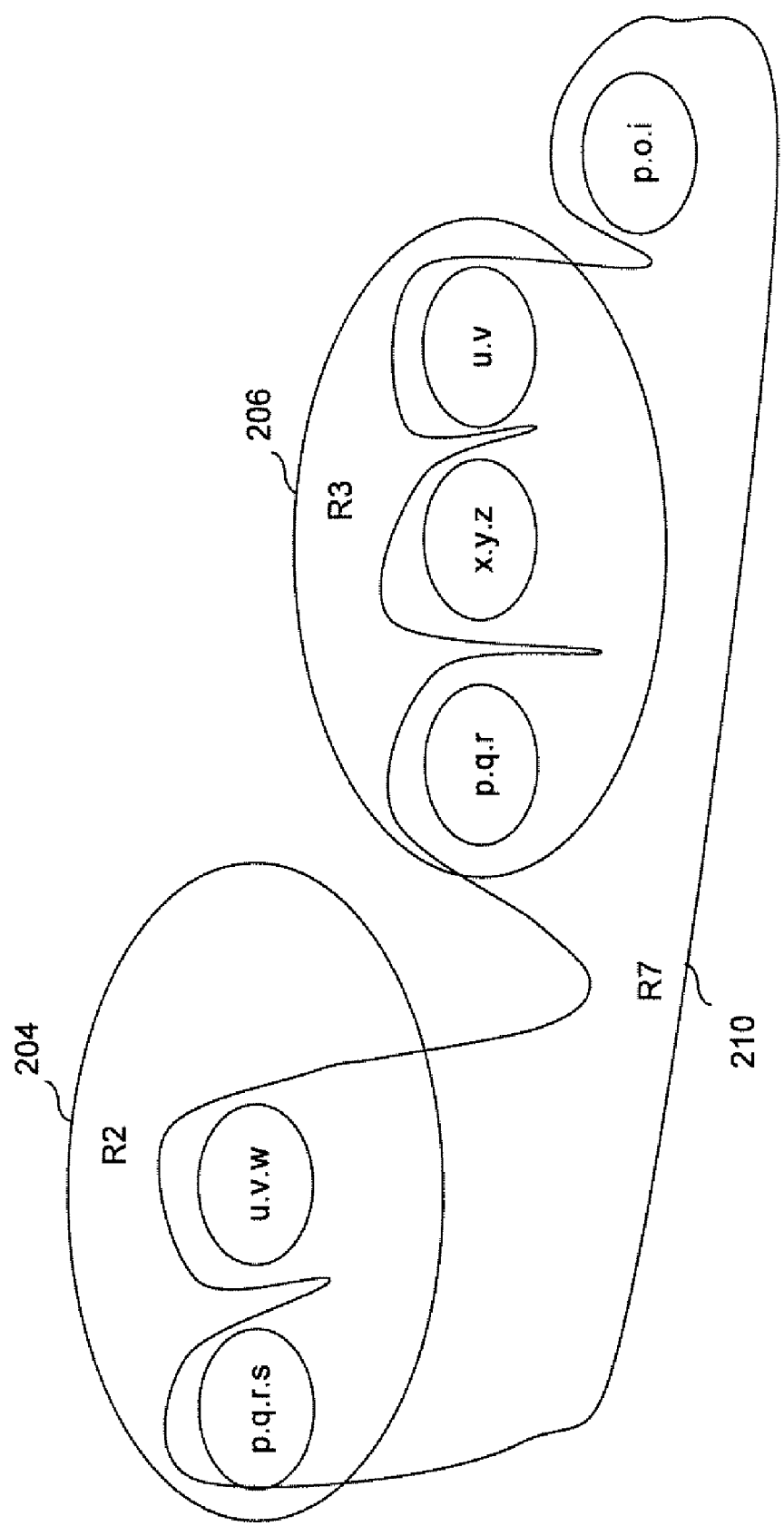

In yet another exemplary embodiment of the present invention, a new role is created using the mathematical operators between certain authorizations and the existing roles. As shown in FIG. 2C, a new role R7 210 is created using the union operator between R2 204 and R3 206, and an additional authorization "p.o.i" (which is not associated with any existing role). Thus, the definition of R7 210 becomes "R7=R2$\cup$R3$\cup$p.o.i". In this case R7 210 will have all the authorizations of R2 204 and R3 206 along with the additional authorization "p.o.i". The creation of R7 210 is useful in scenarios when users, of roles R2 204 and R3 206 are unavailable and these roles need to be assigned to a backup user along with some additional authorization (say "p.o.i").

Figure 2D:
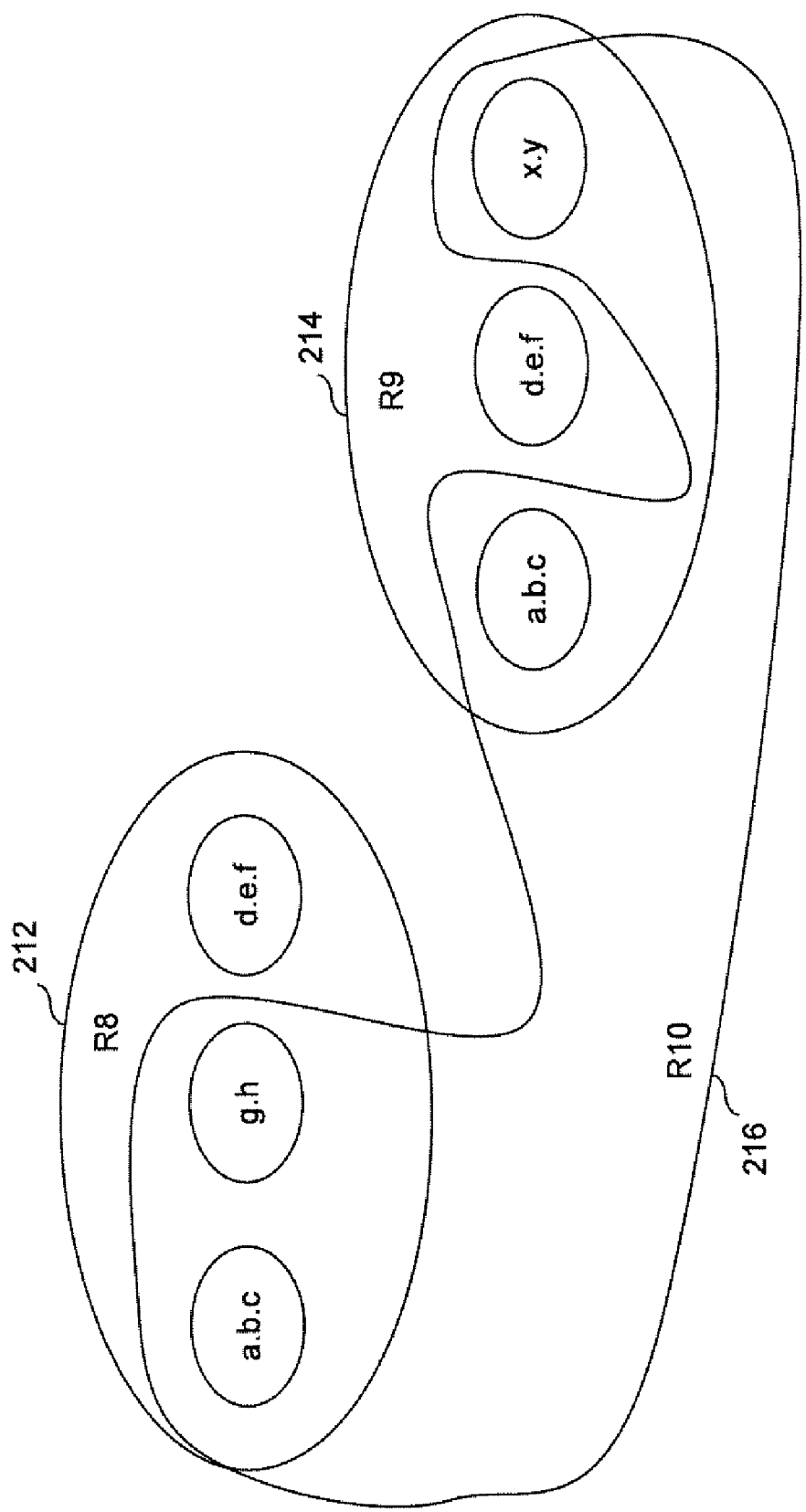

In another embodiment of the present invention, a new role is created using the union operator and the subtraction operator between the existing roles and the authorizations. FIG. 2D shows an exemplary embodiment of the present invention where a role R8 212 is defined as "R8=a.b.c$\cup$g.h$\cup$d.e.f", and a role R9 214 is defined as "R9=a.b.c$\cup$d.e.f$\cup$x.y". Now there may be a situation when users of roles R8 212 and R9 214 are unavailable. In such a situation it may be required that a third user should be assigned a new role which has all the authorizations of R8 212 and R9 214 except the common authorization "d.e.f". This is achieved by creating a new role R10 216 using the union operator and the subtraction operator as "R10=(R8$\cup$R9)–d.e.f".

In an embodiment of the present invention, when a new role is created the authorization database, roles database and other related entities are enabled such that the definition of the new role with mathematical operators is understood by the RBAC system.

Figure 3:
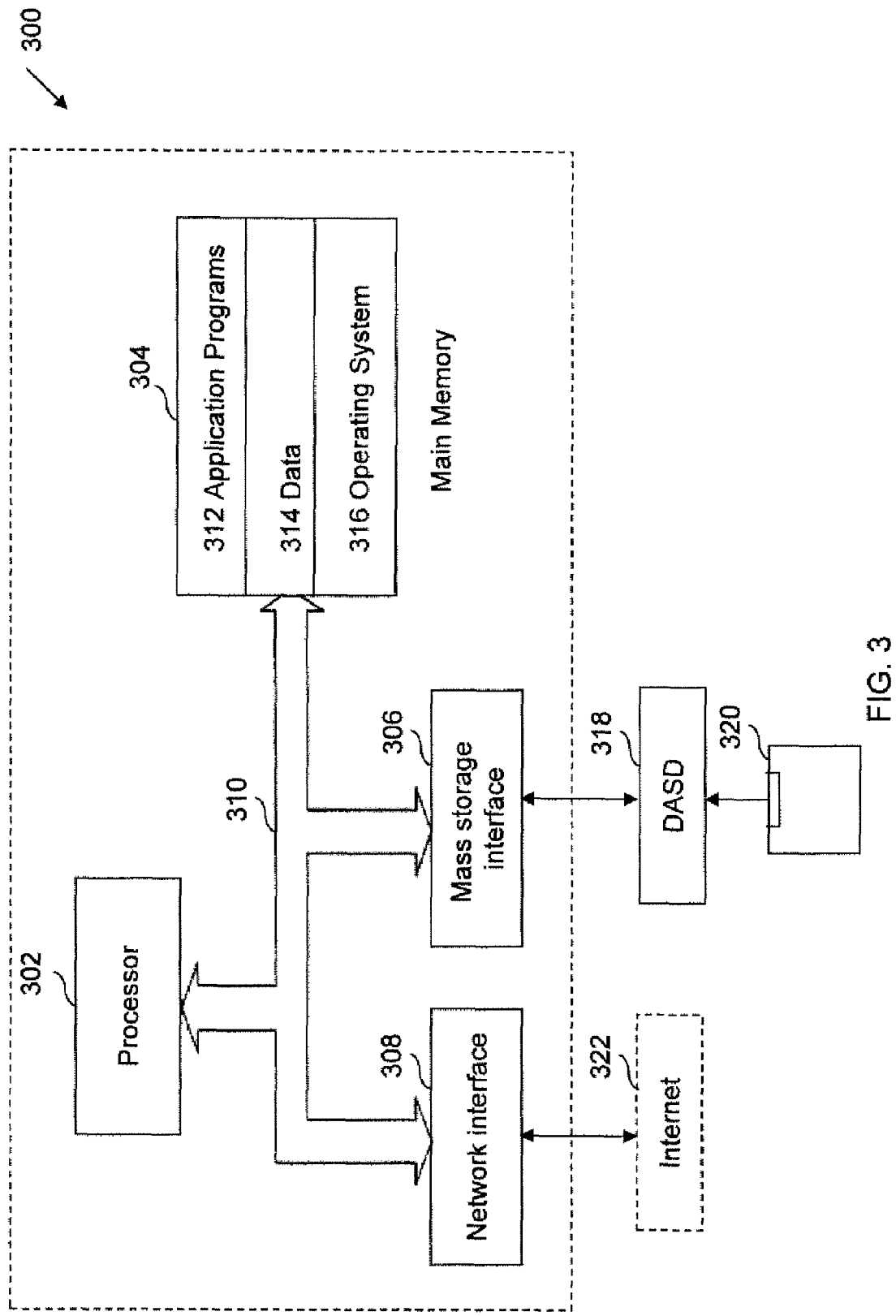
FIG. 3 is a block diagram of an apparatus for creating a new role in a RBAC system in accordance with an embodiment of the present invention.

FIG. 3 is a block diagram of an apparatus for creating a new role in an RBAC system in accordance with an embodiment of the present invention. The apparatus depicted in the FIG. 3 is computer system 300 that includes processor 302, main memory 304, mass storage interface 306, and network interface 308, all connected by system bus 310. Those skilled in the art will appreciate that this system encompasses all types of computer systems: personal computers, midrange computers, mainframes, etc. Note that many additions, modifications, and deletions can be made to this computer system 300 within the scope of the invention. Examples of possible additions include: a display, a keyboard, a cache memory, and peripheral devices such as printers.

FIG. 3 further depicts processor 302 that can be constructed from one or more microprocessors and/or integrated circuits. Processor 302 executes program instructions stored in main memory 304. Main memory 304 stores programs and data that computer system 300 may access.

In an embodiment of the present invention, main memory 304 stores program instructions that perform one or more process steps as explained in conjunction with the FIG. 1. Further, a programmable hardware executes these program instructions. The programmable hardware may include, without limitation, hardware that executes software based program instructions such as processor 302. The programmable hardware may also include hardware where program instructions are embodied in the hardware itself such as Field Programmable Gate Array (FPGA), Application Specific Integrated Circuit (ASIC) or any combination thereof.

FIG. 3 further depicts main memory 304 that includes one or more application programs 312, data 314, and operating system 316. When computer system 300 starts, processor 302 initially executes the program instructions that make up operating system 316. Operating system 316 is a sophisticated program that manages the resources of computer system 300 for example, processor 302, main memory 304, mass storage interface 306, network interface 308, and system bus 310.

In an embodiment of the present invention, processor 302 under the control of operating system 316 executes application programs 312. Application programs 312 can be run with program data 314 as input. Application programs 312 can also output their results as program data 314 in main memory 304.

FIG. 3 further depicts mass storage interface 306 that allows computer system 300 to retrieve and store data from auxiliary storage devices such as magnetic disks (hard disks, diskettes) and optical disks (CD-ROM). These mass storage devices are commonly known as Direct Access Storage Devices (DASD) 318, and act as a permanent store of information. One suitable type of DASD 318 is floppy disk drive that reads data from and writes data to floppy diskette 320. The information from DASD 318 can be in many forms. Common forms are application programs and program data. Data retrieved through mass storage interface 306 is usually placed in main memory 304 where processor 302 can process it.

While main memory 304 and DASD 318 are typically separate storage devices, computer system 300 uses well known virtual addressing mechanisms that allow the programs of computer system 300 to run smoothly as if having access to a large, single storage entity, instead of access to multiple, smaller storage entities (e.g., main memory 304 and DASD 318). Therefore, while certain elements are shown to reside in main memory 304, those skilled in the art will recognize that these are not necessarily all completely contained in main memory 304 at the same time. It should be noted that the term "memory" is used herein to generically refer to the entire virtual memory of computer system 300. In addition, an apparatus in accordance with the present invention includes any possible configuration of hardware and software that contains the elements of the invention, whether the apparatus is a single computer system or is comprised of multiple computer systems operating in concert.

FIG. 3 further depicts network interface 308 that allows computer system 300 to send and receive data to and from any network connected to computer system 300. This network may be a local area network (LAN), a wide area network (WAN), or more specifically Internet 322. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

FIG. 3 further depicts system bus 310 that allows data to be transferred among the various components of computer system 300. Although computer system 300 is shown to contain only a single main processor and a single system bus, those skilled in the art will appreciate that the present invention may be practiced using a computer system that has multiple processors and/or multiple buses. In addition, the interfaces that are used in the preferred embodiment of the present invention may include separate, fully programmed microprocessors that are used to off-load compute-intensive processing from processor 302, or may include I/O adapters to perform similar functions.

In an embodiment of the present invention, the administrator defines new roles using one or more mathematical operators with only authorizations or only existing roles or with a combination thereof. The use of mathematical operators for creating the new roles allows reuse of roles and authorizations from one user to another user. The present invention further allows defining common roles and authorizations between different users. The present invention also allows delegation of roles and authorizations based on definitions using mathematical operators.

The present invention may take the form of an entirely hardware embodiment, an entirely software embodiment or an embodiment containing both hardware and software elements. In accordance with an embodiment of the present invention, the invention is implemented in software, which includes, but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The afore-mentioned medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W), DVD and blu-ray disk.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A computer implemented process for defining a new role in a Role Based Access Control (RBAC) system, the computer implemented process comprising:

a computer creating the new role by using a union operator and a subtraction operator between one or more existing roles and one or more existing authorizations to create a set of authorizations common to at least two existing roles, and then adding at least one first authorization or subtracting at least one second authorization to the set; and the computer defining the new role in an operating system specific hierarchal order with a dot operator between each authorization.

2. The computer implemented process of claim 1, wherein one or more authorizations are defined in a hierarchical order.

3. The computer implemented process of claim 1, wherein the new role is stored in a role database.

4. The computer implemented process of claim 3, wherein the role database is managed at a local file system.

5. The computer implemented process of claim 3, wherein the role database is managed remotely through a Lightweight Directory Access Protocol (LDAP).

6. The computer implemented process of claim 3, wherein the new role is stored as a mathematical combination the one or more authorizations and the one or more existing roles.

7. The computer implemented process of claim 3, wherein the role database is a system file.

8. A computer system for defining a new role in a Role Based Access Control (RBAC) system, comprising:
   one or more processors, one or more computer readable memories, and one or more computer readable storage devices;
   program instructions stored in the one or more computer readable storage devices for execution via the one or more computer readable memories to create the new role by using a union operator and a subtraction operator between one or more existing roles and one or more existing authorizations to create a set of authorizations common to at least two existing roles, and then adding at least one first authorization or subtracting at least one second authorization to the set; and
   program instructions stored in the one or more computer readable storage devices for execution via the one or more computer readable memories to define the new role in an operating system specific hierarchal order with a dot operator between each authorization.

9. A computer program product for causing a computer to define a new role in a Role Based Access Control (RBAC) system, comprising:
   one or more computer readable storage devices;
   program instructions stored in the one or more computer readable storage devices to create a set of authorizations common to at least two existing roles, and then adding at least one first authorization or subtracting at least one second authorization to the set; and
   program instructions stored in the one or more computer readable storage devices to define the new role in an operating system specific hierarchal order with a dot operator between each authorization.

10. The computer program product of claim 9, wherein the new role is stored in a role database.

11. The computer program product of claim 10, wherein the role database is managed at a local file system.

12. The computer program product of claim 10, wherein the role database is managed remotely through a Lightweight Directory Access Protocol (LDAP).

13. The computer system of claim 8, wherein the role database is a system file.

* * * * *